US010264267B2

United States Patent
Huang et al.

(10) Patent No.: US 10,264,267 B2
(45) Date of Patent: Apr. 16, 2019

(54) METHOD FOR COMPRESSING IMAGE DATA AND IMAGE DATA COMPRESSING SYSTEM

(71) Applicant: MStar Semiconductor, Inc., Hsinchu, Hsien (TW)

(72) Inventors: Yi-Chin Huang, Hsinchu Hsien (TW); Yi-Shin Tung, Hsinchu Hsien (TW)

(73) Assignee: MSTAR SEMICONDUCTOR, INC., Chupei, Hsinchu Hsien (TW)

( * ) Notice: Subject to any disclaimer, the term of this patent is extended or adjusted under 35 U.S.C. 154(b) by 41 days.

(21) Appl. No.: 15/485,315

(22) Filed: Apr. 12, 2017

(65) Prior Publication Data

US 2017/0353728 A1    Dec. 7, 2017

(30) Foreign Application Priority Data

Jun. 4, 2016    (TW) .............................. 105117731 A (51) Int. Cl.
*H04N 19/146*    (2014.01)
*H04N 19/176*    (2014.01)
(Continued)

(52) U.S. Cl.
CPC ......... *H04N 19/146* (2014.11); *H04N 19/132* (2014.11); *H04N 19/15* (2014.11); *H04N 19/176* (2014.11); *H04N 19/184* (2014.11)

(58) Field of Classification Search
CPC .. H04N 19/146; H04N 19/184; H04N 19/132; H04N 19/15; H04N 19/176
See application file for complete search history.

(56) References Cited

U.S. PATENT DOCUMENTS

| 4,980,761 A * | 12/1990 | Natori ...................... H04N 7/15 |
| | | 348/14.08 |
| 2004/0136599 A1* | 7/2004 | Kadowaki .............. H04N 19/63 |
| | | 382/232 |

(Continued)

FOREIGN PATENT DOCUMENTS

JP    2014082772 A    5/2014

*Primary Examiner* — Ming Y Hon
(74) *Attorney, Agent, or Firm* — McClure, Qualey & Rodack, LLP (57) ABSTRACT

A method for compressing image data is provided. The image data includes a file to be compressed, which includes N blocks to be compressed. The method includes: setting a target data increment of each of the N blocks of the file according to a $0^{th}$ accumulated target data size and an $N^{th}$ accumulated target data size; before compressing an $n^{th}$ block, calculating an $(n-1)^{th}$ accumulated target data size of an $(n-1)^{th}$ block according to the $0^{th}$ accumulated target data size and the target data increment; when a difference between an $(n-1)^{th}$ accumulated compressed data size and the $(n-1)^{th}$ accumulated target data size is smaller than a predetermined threshold, removing X least significant bit(s) of a plurality of sets of data in the $n^{th}$ block to generate an updated $n^{th}$ block; and compressing the updated $n^{th}$ block to generate a compressed $n^{th}$ block.

12 Claims, 5 Drawing Sheets

(51) Int. Cl.
*H04N 19/15* (2014.01)
*H04N 19/132* (2014.01)
*H04N 19/184* (2014.01)

(56) References Cited

U.S. PATENT DOCUMENTS

| | | | | |
|---|---|---|---|---|
| 2004/0146215 | A1* | 7/2004 | Hatanaka | H04N 19/60 |
| | | | | 382/239 |
| 2006/0132618 | A1* | 6/2006 | Fujita | H04N 1/2112 |
| | | | | 348/222.1 |
| 2007/0177809 | A1* | 8/2007 | Takahashi | H04N 5/232 |
| | | | | 382/232 |
| 2008/0285866 | A1* | 11/2008 | Ishikawa | H04N 19/172 |
| | | | | 382/232 |
| 2015/0249827 | A1* | 9/2015 | Hasegawa | G06K 15/02 |
| | | | | 382/239 |
| 2015/0277776 | A1* | 10/2015 | Okamoto | H04N 19/426 |
| | | | | 382/244 |
| 2017/0148421 | A1* | 5/2017 | Liu | G06F 3/14 |

* cited by examiner

METHOD FOR COMPRESSING IMAGE DATA AND IMAGE DATA COMPRESSING SYSTEM

This application claims the benefit of Taiwan application Serial No. 105117731, filed Jun. 4, 2016, the subject matter of which is incorporated herein by reference.

BACKGROUND OF THE INVENTION

Field of the Invention

The invention relates in general to a method for compressing image data, and more particularly to an image data compressing method capable of controlling a compression rate.

Description of the Related Art

Figure 1:
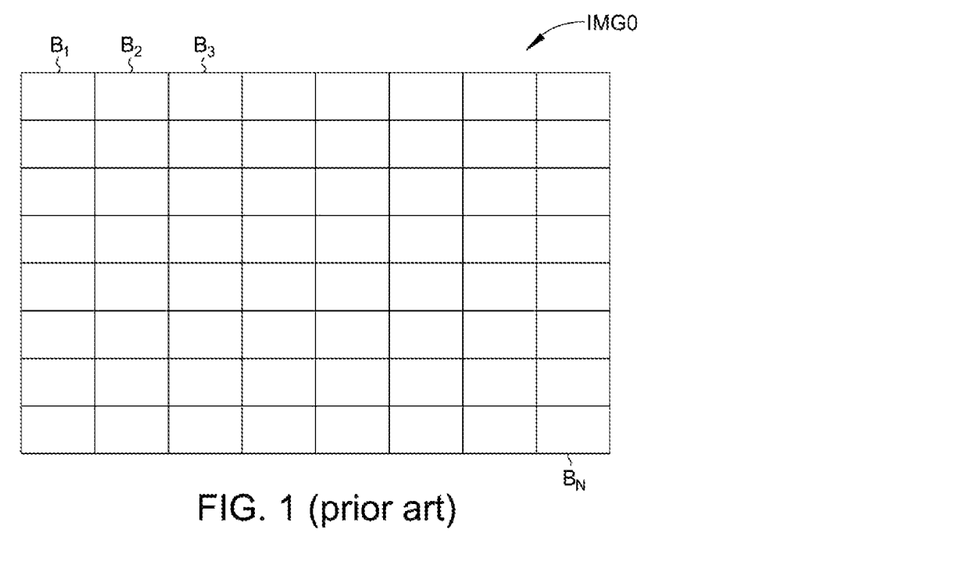
FIG. 1 is a schematic diagram of image data of the prior art.

In the prior art, in order to efficiently utilize hardware resources when image data is compressed, an image is usually divided into a plurality of blocks and then compressed in a unit of image blocks. FIG. 1 shows a schematic diagram of image data IMG0 of the prior art. In FIG. 1, the image data IMG0 may be divided into a plurality of image blocks $B_1$ to $B_N$, which are then sequentially compressed by a raster scan method when the image data IMG0 is compressed. The compression method may be lossless compression or lossy compression.

Compared to lossless compression, lossy compression may yield a higher compression rate. However, even having been decompressed, a file compressed by lossy compression may not be successfully restored to an original file, hence frequently leading to degraded image quality.

To maintain image quality, the image blocks $B_1$ to $B_N$ may be compressed by lossless compression. Thus, distortion-free image blocks $B_1$ to $B_N$ can be obtained after decompressing the compressed image blocks $B_1$ to $B_N$. However, lossless compression does not guarantee the compression rate. In other words, due to possible differences in image characteristics of the image blocks $B_1$ to $B_N$, compressed data sizes of the compressed image blocks $B_1$ to $B_N$ processed by lossless compression may also differ, in a way that the compressed data sizes cannot be predicted.

Without a guaranteed compression rate, lossless compression is unsuitable for some applications with limited memory resources. On the other hand, if compression is conducted using lossy compression, the issue of poor image quality may be resulted. Therefore, there is a need for a solution that attends to both the compression rate and image quality.

SUMMARY OF THE INVENTION

A method for compressing image data is provided according to an embodiment of the present invention. The method, applied to a file to be compressed including N blocks to be compressed, includes: setting a target data increment of each of the N blocks of the file according to a $0^{th}$ accumulated target data size and an $N^{th}$ accumulated target data size; before compressing an $n^{th}$ block among the N blocks, calculating an $(n-1)^{th}$ accumulated compressed data size of an $(n-1)^{th}$ block among the N blocks; calculating an $(n-1)^{th}$ accumulated target data size of the $(n-1)^{th}$ block according to the $0^{th}$ accumulated target data size and the target data increment; when a difference between the $(n-1)^{th}$ accumulated compressed data size and the $(n-1)^{th}$ accumulated target data size is smaller than a first predetermined threshold, removing X least significant bit(s) (LSB) of a plurality of sets of data of the $n^{th}$ block to generate an updated $n^{th}$ block; and compressing the updated $n^{th}$ block to generate a compressed $n^{th}$ block. Wherein, N and X are finite positive integers, and n is a finite positive integer not greater than N.

An image data compressing system is provided according to another embodiment of the present invention. The image data compressing system includes a compression module and a compression rate control circuit. The compressing module compresses data of a file to be compressed that includes N blocks to be compressed according to a compression algorithm. The compression rate control circuit, coupled to the compressing module, includes a compressed data accumulating module, a target data accumulating module and a comparing module. Before an $n^{th}$ block among the $N^{th}$ blocks is compressed, the compressed data accumulating module calculates an $(n-1)^{th}$ accumulated compressed data size of an $(n-1)^{th}$ block among the N blocks according to a block compressed data size that the compressing module generates after compressing the $(n-1)^{th}$ block. The target data size accumulating module calculates an $(n-1)^{th}$ accumulated target data size of the $(n-1)^{th}$ block according to a $0^{th}$ accumulated target data size and a target data increment of each of the N blocks. When a difference between the $(n-1)^{th}$ accumulated compressed data size and the $(n-1)^{th}$ accumulated target data size is smaller than a first predetermined threshold, the comparing module outputs a first compression control signal to the compressing module. When the first compression control module is received, the compressing module removes X least significant bit(s) (LSB) of a plurality of sets of data of the $n^{th}$ block to generate an updated $n^{th}$ block, and compresses the updated $n^{th}$ block to generate a compressed $n^{th}$ block. Wherein, N and X are finite positive integers, and n is a finite positive integer not greater than N.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
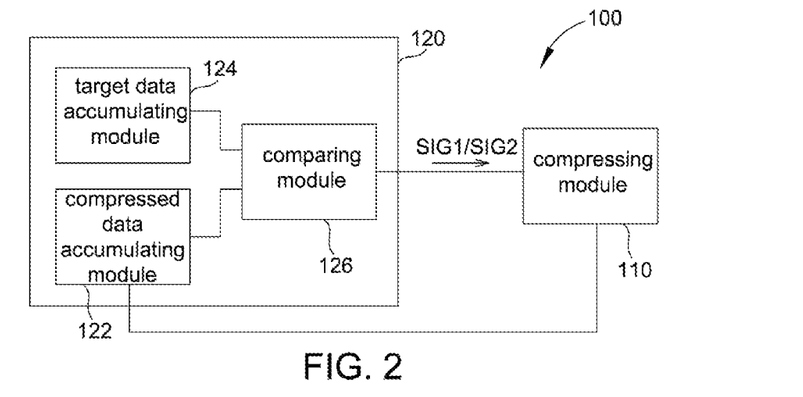
FIG. 2 is a schematic diagram of an image data compressing system according to an embodiment of the present invention.

FIG. 2 is a schematic diagram of an image data compressing system 100 according to an embodiment of the present invention. The image data compressing system 100 includes a compressing module 110 and a compression rate control circuit 120.

The compressing module 110 compresses image data according to a predetermined compression algorithm. In one preferred embodiment of the present invention, the compressing module 110 may select a lossless compression algorithm to compress image data. However, the present invention does not limit the compressing module 110 to compressing image data by a lossless compression algorithm, and image data may also be compressed by a lossy compression algorithm that possibly causes distortion.

The compression rate control circuit 120, coupled to the compressing module 110, includes a compressed data accumulating module 122, a target data size accumulating module 124, and a comparing module 126. In some embodiments of the present invention, the image data compressing system 100 may be applied to compress image data IMG0 in FIG. 1. When the image data IMG0 serves as an image to be compressed by the image data compressing system 100, the compression rate control circuit 120 may dynamically adjust a compression rate of each of the image blocks $B_1$ to $B_N$ according to a user-defined or system-predetermined compression rate, so as to prevent a final accumulated compressed data size of the N image blocks $B_1$ to $B_N$ from exceeding a final target data size.

Figure 3:
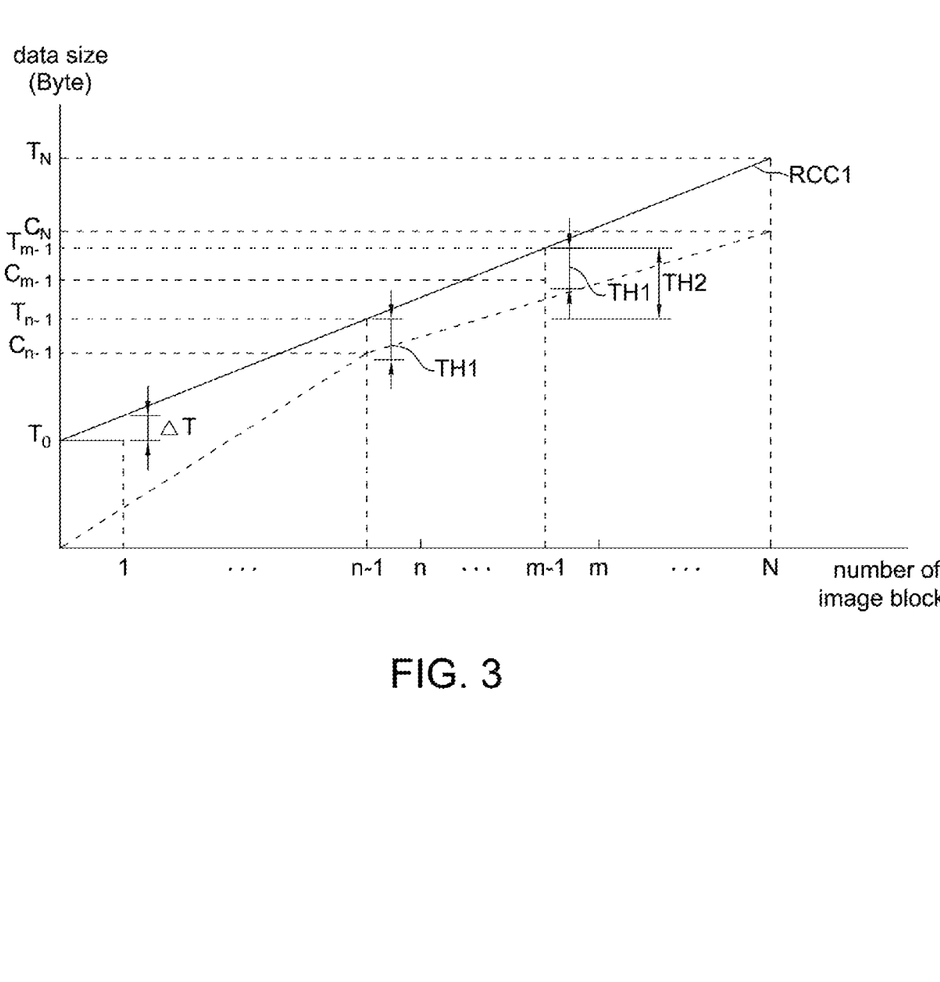
FIG. 3 is a schematic diagram of a compression rate control curve of an image data compressing system according to an embodiment of the present invention.

FIG. 3 shows a schematic diagram of a compression rate control curve RCC1 of the image data compressing system 100 according to an embodiment of the present invention. In FIG. 3, the horizontal axis represents the number of compressed image blocks, and the vertical axis represents the data size, which may be in a unit of bytes. When the compressed image block is the $0^{th}$ one, it means there is not yet any image block that has been compressed, and the data size corresponding to the compression rate control curve RCC1 at this point is a $0^{th}$ accumulated target data size $T_0$. When the compressed image block is N, it means that the image blocks $B_1$ to $B_N$ in the image data IMG0 have all been compressed, and the data size corresponding to the compression rate control curve RCC1 at this point is an $N^{th}$ accumulated target data size $T_N$, i.e., the final target data size.

In some embodiments of the present invention, assuming that the compression rate is a ratio of a total data size before compression to a total data size after compression, the $N^{th}$ accumulated target data size $T_N$ may be a total data size of the file to be compressed divided by the target compression rate. For example, assuming that the total data size of the image data IMG0 is 1 MB and the target compression rate is 1.25, the $N^{th}$ accumulated target data size $T_N$ is 1 MB divided by 1.25, i.e., 0.8 MB. The target compression rate may be user-defined or system-predetermined.

To ensure that a final $N^{th}$ accumulated compressed data size $C_N$ of the N image blocks $B_1$ to $B_N$ compressed by the compressing module 110 does not exceed the $N^{th}$ accumulated target data size $T_N$, before an $n^{th}$ block among the N blocks is compressed, e.g., before the image block $B_n$ (where n is a finite positive integer not greater than N) is compressed, the compressed data accumulating module 122 may calculate an $(n-1)^{th}$ accumulated compressed data size $C_{n-1}$ of an $(n-1)^{th}$ block, i.e., the actual compressed data size after the image blocks $B_1$ to $B_{n-1}$ have been compressed. The comparing module 126 may further compare the $(n-1)^{th}$ accumulated compressed data size $C_{n-1}$ with an $(n-1)^{th}$ accumulated target data size $T_{n-1}$ corresponding to the $(n-1)^{th}$ block in the compression rate control curve RCC1, and determine a difference between the two.

The $(n-1)^{th}$ accumulated target data size $T_{n-1}$ may be obtained through calculating the N blocks of the image data IMG0, i.e., a target data increment $\Delta T$ of each of the image blocks $B_1$ to $B_N$, and the $0^{th}$ accumulated target data size $T_0$, by the target data accumulating module 124. Wherein, the target data increment $\Delta T$ is a slope $$\frac{T_N - T_0}{N}$$

of the compression rate control curve RCC1. In the above situation, the $(n-1)^{th}$ accumulated target data size $T_{n-1}$ may be represented by equation (1):

$$T_{n-1} = T_0 + \frac{T_N - T_0}{N} \times (n-1) \qquad \text{equation (1)}$$

In some embodiments of the present invention, the target data accumulating module 124 is limited to directly obtaining the $(n-1)^{th}$ accumulated target data size $T_{n-1}$ by equation (1). Alternatively, the target data accumulating module 124 may also calculate the $(n-1)^{th}$ accumulated target data size $T_{n-1}$ through adding up the target data increment $\Delta T$, so as to reduce the computation amount of multiplication and to simplify hardware. In FIG. 3, as the difference between the $(n-1)^{th}$ accumulated compressed data size $C_{n-1}$ and the $(n-1)^{th}$ accumulated target data size $T_{n-1}$ is smaller than a predetermined threshold TH1, it means that the current accumulated compressed data size $C_{n-1}$ approximates the current $(n-1)^{th}$ accumulated target data size $T_{n-1}$. Thus, if the $n^{th}$ block, i.e., the image block $B_n$, is compressed in continuation using the current compression method, it is likely that the final $N^{th}$ accumulated compressed data size $C_N$ become greater than the $N^{th}$ accumulated target data size $T_N$.

In the above situation, the comparing module 124 may output a first compression control signal SIG1 to the compressing module 110. When the first compression control signal SIG1 is received, the compressing module 110 removes X least significant bit(s) (LSB) of a plurality of sets of data in the $n^{th}$ block, i.e., the image block $B_n$, to generate an updated $n^{th}$ block, compresses the updated $n^{th}$ block to generate a compressed $n^{th}$ block, and stores the compressed $n^{th}$ block to a memory. Wherein, X may be a user-defined or system-predetermined positive integer. In some embodiments of the present invention, X may be 1 or 2. Because the LSB less affects the overall value of data, no significant influence is produced on the image quality.

As such, the bit count of each set of data in the updated $n^{th}$ block is smaller than the bit count of each set of data in the original $n^{th}$ block, and the compressed data size after compressing the updated $n^{th}$ block is also smaller than the compressed data size of directly compressing the original $n^{th}$ block. Thus, the $N^{th}$ accumulated compressed data size $C_N$ is prevented from becoming greater than the $N^{th}$ accumulated target data size $T_N$, and the effect of controlling the compression rate is achieved.

In some applications of image compression, it is possible that the LSB of each set of data in an image block be used as reserved reference bits, which influence the final image quality only in certain special circumstances. Values of such type of reserved reference bits are usually difficult to predict, and frequently cause compression complications and thus a reduced compression rate. In the above situation, by removing the X LSB of a plurality of sets of data in the image block $B_n$, not only the data size of data that needs to be compressed is decreased, but also correlation levels among the plurality of sets of data in the image block $B_n$ are increased, which helps the compressing module 110 perform the compression, hence further enhancing the compression rate.

In other embodiments of the present invention, when the difference between the $(n-1)^{th}$ accumulated compressed data size $C_{n-1}$ and the $(n-1)^{th}$ accumulated target data size $T_{n-1}$ is greater than the predetermined threshold TH1, it means that the current accumulated compressed data size is not close to the current accumulated target data size, and so maintaining image quality may still be prioritized. At this point, the comparing module 126 does not output the first control signal SIG1 to the compressing module or it outputs other control signals different from the first control signal SIG1, such that the compressing module 110 may directly compress the $n^{th}$ block without removing any data bits.

Further, to prevent the compressing module 110 from removing a part of the LSB of each of a plurality of sets of data in the image block $B_1$ at the beginning and from unnecessarily compromising the image quality, the image data compressing system 100 may set the $0^{th}$ accumulated target data amount $T^0$ to be greater than the first threshold TH1.

As described, the image data compressing system 100 is capable of adjusting the compression rate of the image block $B_n$ according to the difference between the $(n-1)^{th}$ accumulated compressed data size $C_{n-1}$ of the $(n-1)^{th}$ image block $B_{n-1}$ and the $(n-1)^{th}$ accumulated target data size $T_{n-1}$ of the $(n-1)^{th}$ image block $B_{n-1}$ corresponding to the compression rate control curve RCC1, and first removes a part of the LSB of each set of data in the image block $B_n$ in a situation where the compression rates of the previous $(n-1)$ number of image blocks $B_1$ to $B_{n-1}$ are rather low. Therefore, the image data compressing system 100 is capable of adaptively adjusting the compression rate while maintaining image quality at the same time.

Further, in some embodiments of the present invention, the compression rate control circuit 120 may adjust the number of LSB that the compressing module 110 removes from each set of data in the image blocks. For example, in FIG. 3, before the $m^{th}$ block is compressed, e.g., before the image block $B_m$ is compressed (where m is a finite positive integer not greater than N), the compression data accumulating module 122 may first calculate the $(m-1)^{th}$ accumulated compressed data size $C_{m-1}$ of the $(m-1)^{th}$ block, i.e., the actual accumulated compressed data size of the image blocks $B_1$ to $B_{m-1}$ having been compressed. The target data accumulating module 124 may calculate the accumulated target data size $T_{m-1}$ of the $(m-1)^{th}$ block corresponding to the compression rate control curve RCC1 according to the $0^{th}$ accumulated target data size $T_0$ and the target data increment $\Delta T$. Next, the comparing module 126 may compare the $(m-1)^{th}$ accumulated compressed data size $C_{m-1}$ and the $(m-1)^{th}$ accumulated target data size $T_{m-1}$, and determine the difference between the two.

In the embodiment in FIG. 3, the difference between the $(m-1)^{th}$ accumulated compressed data size $C_{m-1}$ and the $(m-1)^{th}$ accumulated target data size $T_{m-1}$ is greater than the first predetermined threshold TH1 but smaller than the second predetermined threshold TH2, wherein the second predetermined threshold TH2 is greater than the first predetermined threshold TH1. That is to say, although the current $(m-1)^{th}$ accumulated compressed data size is close to the $(m-1)^{th}$ accumulated target data size $T_{m-1}$ and possibly cause the $N^{th}$ accumulated compressed data size $C_N$ to be greater than the $N^{th}$ accumulated target data size $T_N$, such occurrence is not severe. Thus, the comparing module 126 may output a second compression control signal SIG2 to the compressing module. When the compressing module 110 receives the second compression control signal SIG2, the compressing module 110 may remove Y LSB of a plurality of sets of data in the $m^{th}$ block, i.e., the image block $B_m$, to generate the updated $m^{th}$ block that needs to be compressed. The updated $m^{th}$ block is then compressed to generate a compressed $m^{th}$ block that is stored to a memory.

For example, X may be 2 and Y may be 1. Thus, when the comparing module 126 determines that the difference between the current accumulated compressed data size and the current accumulated target data size is greater than the first predetermined threshold TH1 but smaller than the second predetermined threshold TH2, the comparing module 126 outputs the second compression control signal SIG2 to cause the compressing module 1120 to first remove the 1 LSB of each set of data in the image block before the image block is compressed. In contrast, when the difference between the current accumulated compressed data size and the current accumulated target data size is smaller than the first predetermined threshold, the comparing module 126 may output the first compression control signal SIG1 to cause the compressing module 110 to first remove 2 LSBs of each set of data in the image block before the image block is compressed.

As such, the image data compressing system 100 may adaptively determine whether to remove the LSB of each set of data in an image block that needs to be compressed, and the number of LSB to be removed if so, thereby more accurately controlling the compression rate and image quality. In some embodiments of the present invention, the image data compressing system 100 may set more predetermined thresholds based on system requirements to allow the image data compressing system 100 to be better in fine-tuning the compression rate. One person skilled in the art may implement the foregoing embodiments in form of digital circuits in the compression rate control circuit 120, and associated details are omitted herein.

Figure 4:
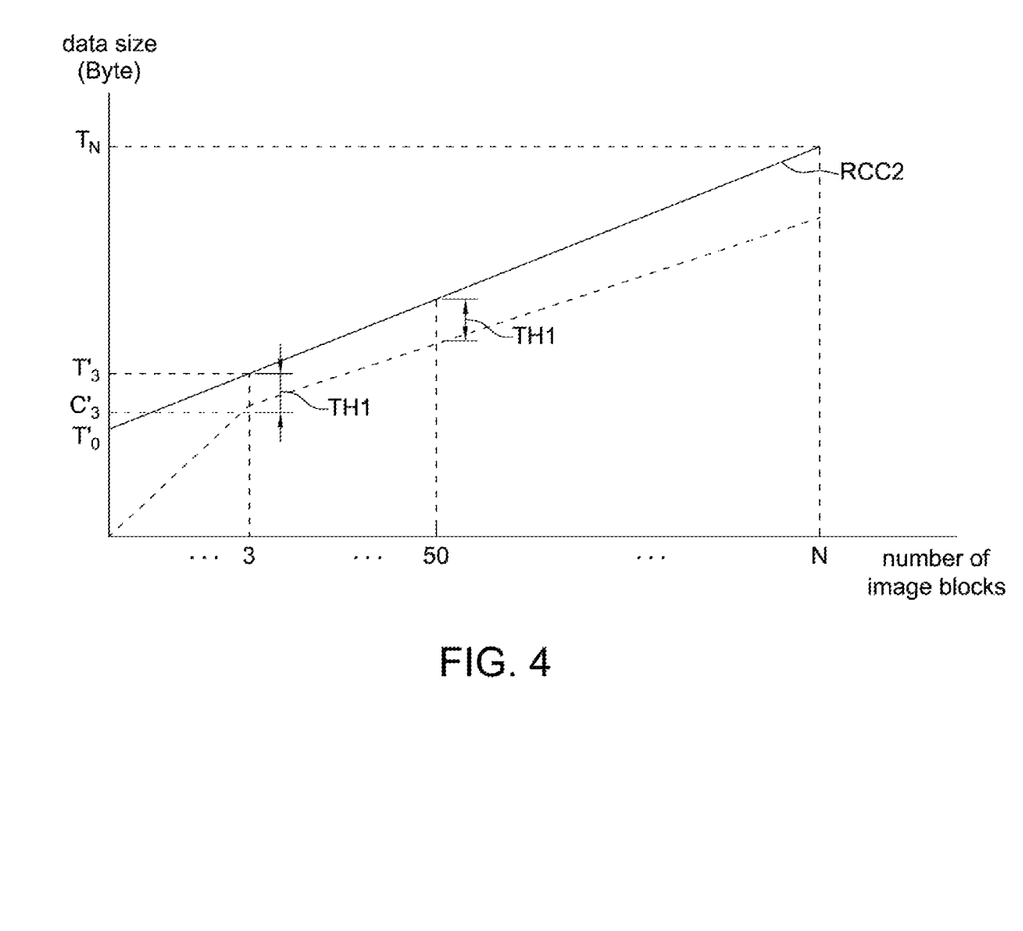
FIG. 4 is a schematic diagram of a compression rate control curve according to another embodiment of the present invention.
Figure 5:
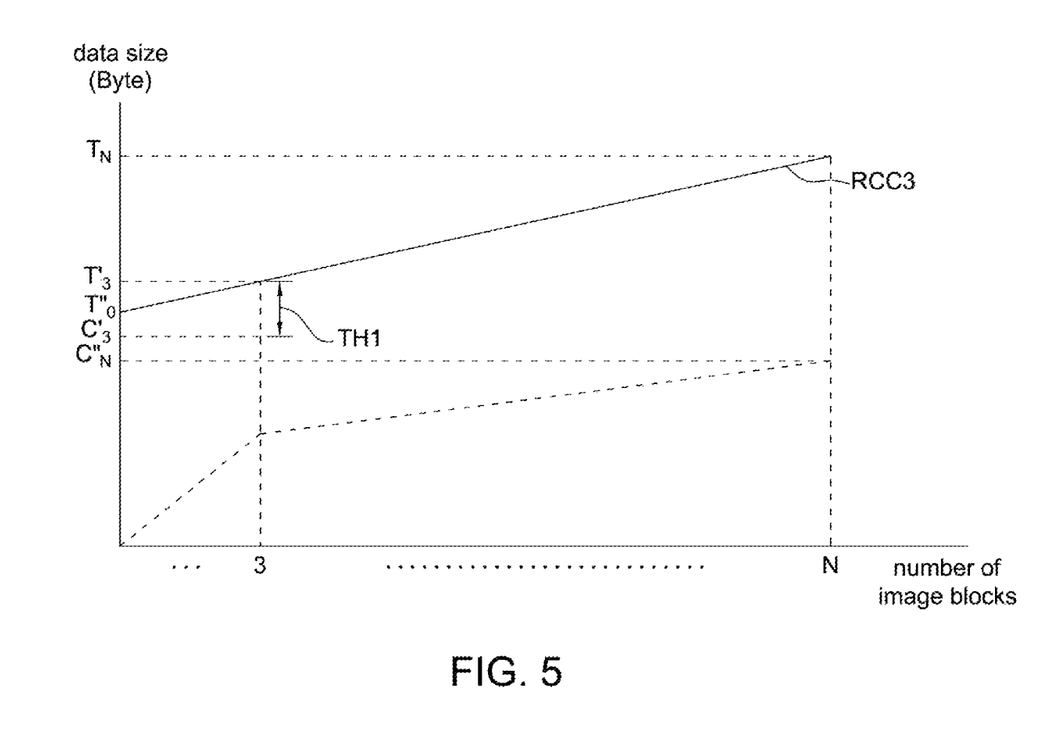
FIG. 5 is a schematic diagram of a compression rate control curve according to another embodiment of the present invention.

FIG. 4 and FIG. 5 show schematic diagrams of compression control curves RCC2 and RCC3 according to different embodiments of the present invention. The $N^{th}$ accumulated target data sizes $T_N$ in FIG. 4 and FIG. 5 are the same, with however a $0^{th}$ accumulated target data size $T'0$ in FIG. 4 being smaller than a $0^{th}$ accumulated target data size $T''0$ in FIG. 5. Thus, when the N image blocks $B_1$ to $B_N$ of the image data IMG0 are compressed, taking the compression rate control curve RCC2 in FIG. 4 for instance, starting from the image block $B_3$, a difference between a $3^{rd}$ accumulated compressed data size $C'_3$ and a $3^{rd}$ accumulated target data size $T'_3$ is already smaller than the first threshold TH1. Therefore, the compression rate control circuit 120 removes the X LSB from each set of data in the image block $B_4$ and continues removing the X LSB from each set of data in the subsequent image blocks. It is possible that, the compression rate control circuit 120 only stops removing a part of the LSB from each set of data in the image blocks when the image block $B_{50}$ is compressed.

In comparison, taking the compression rate control curve RCC3 in FIG. 5 for instance, the $0^{th}$ accumulated target data size $T''_0$ is larger, and so a difference between a $3^{rd}$ accumulated compressed data size $C''_3$ and a $3^{rd}$ accumulated target data size $T''_3$ may be maintained to be greater than the first threshold TH1. As such, the image data compressing system 100, without removing any LSB of any block data, may provide a final $N^{th}$ accumulated compressed data size $C''_N$ that is smaller than the $N^{th}$ accumulated target data size $T_N$.

That is to say, the selection of the $0^{th}$ accumulated target data size may affect the timing at which the compression rate control circuit 120 removes the LSB of block data that needs to be compressed. In the image data IMG0, only a part of the image blocks that are first compressed and cannot be easily compressed may lead to a low compression rate, whereas a part of the image blocks that are later compressed may still maintain a high compression rate. In the above situation, if a smaller $0^{th}$ accumulated target data size $T_0$ is selected, the compression rate control circuit 120 may be caused to inappropriately remove LSB of block data that needs to be compressed and unnecessarily reduce image quality.

Due to different characteristics of data of different images, in some embodiments of the present invention, the compression rate control circuit 120 may also update the $0^{th}$ accumulated target data size according to compression archives or compression trends of compressed blocks of previously compressed files. Thus, the image data compressing system 100 may be prevented from inappropriately removing the LSB of a part of the block data and hence from unnecessarily lowering the image quality. One person skilled in the art can implement the foregoing embodiments by digital circuits in the compression rate control circuit 120, and associated details are omitted herein.

Figure 6:
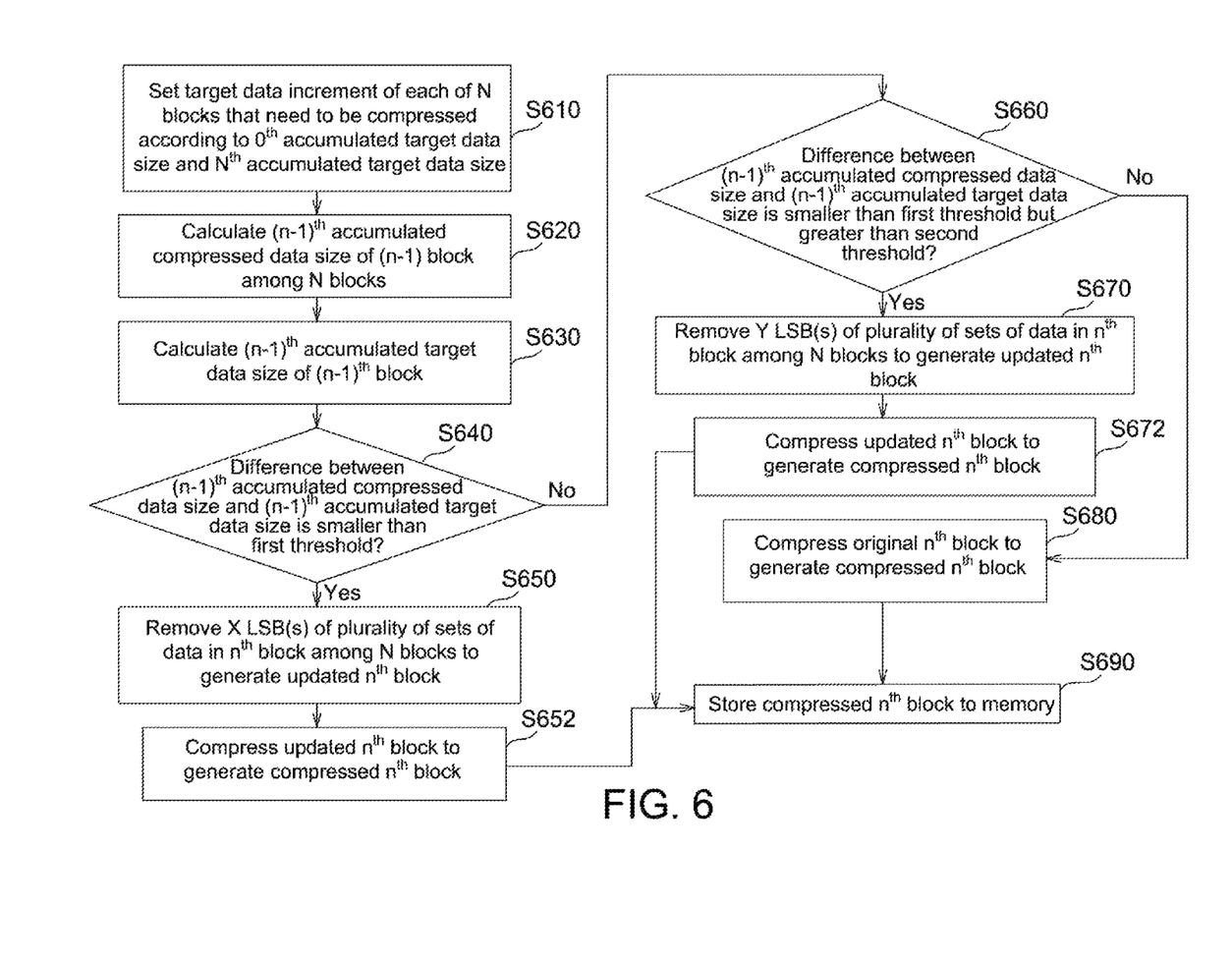
FIG. 6 is a flowchart of a method for compressing image data according to an embodiment of the present invention.

FIG. 6 shows a flowchart of a method 600 for compressing image data according to an embodiment of the present invention. The method 600 may apply the compression rate control curve RCC1 in FIG. 3 to compress a file that needs to be compressed. For example but not limited to, the method 600 includes following steps.

In step S610, a target data increment ΔT of each of N blocks that need to be compressed in a file to be compressed is calculated according to a $0^{th}$ accumulated target data size $T_0$ and an $N^{th}$ accumulated target data size $T_N$.

In step S620, before an $n^{th}$ block among the N blocks is compressed, an $(n-1)^{th}$ accumulated compressed data size $C_{n-1}$ is calculated.

In step S630, an accumulated target data size $T_{n-1}$ of an $(n-1)^{th}$ block among the N blocks is calculated according to the $0^{th}$ accumulated target data size $T_0$ and the target data increment ΔT.

In step S640, it is determined whether a difference between the $(n-1)^{th}$ accumulated compressed data size $C_{n-1}$ and the accumulated target data size $T_{n-1}$ is smaller than a first predetermined threshold TH1. Step S650 is performed if so, otherwise step S660 is performed if not.

In step S650, X least significant bit(s) of a plurality of sets of data of the $n^{th}$ block that needs to be compressed is/are removed to generate an updated $n^{th}$ block.

In step S652, the updated $n^{th}$ block is compressed to generate a compressed $n^{th}$ block, followed by performing step S690.

In step S660, it is determined whether the difference between the $(n-1)^{th}$ accumulated compressed data size $C_{n-1}$ and the $(n-1)^{th}$ accumulated target data size $T_{n-1}$ is greater than the first predetermined threshold TH1 but smaller than a second predetermined threshold TH2. Step S670 is performed if so, otherwise step S680 is performed if not.

In step S670, Y least significant bit(s) of a plurality of sets of data of the $n^{th}$ block that needs to be compressed is/are removed to generate an updated $n^{th}$ block.

In step S672, the updated $n^{th}$ block is compressed to generate a compressed $n^{th}$ block, followed by performing step S690.

In step 680, the original $n^{th}$ block is compressed to generate a compressed $n^{th}$ block.

In step S690, the compressed $n^{th}$ block is stored in a memory.

The method 600 is applicable to compress the image data IMG0. In step S610, the file that needs to be compressed at this point is the image data IMG0, and the N blocks that need to be compressed in the file are N image blocks $B_1$ to $B_N$ of the image data IMG0. It should be noted that, the method for compressing image data and the image data compressing system of the present invention are not limited to compressing image data. In other embodiments, the method for compressing image data and the image data compressing system of the present invention may be applied to compress data of other types of files.

In some embodiments of the present invention, instead of comparing the difference between the $(n-1)^{th}$ accumulated compressed data size $C_{n-1}$ and the $(n-1)^{th}$ accumulated target data size $T_{n-1}$ only with the first predetermined threshold TH1 and the second predetermined threshold TH2, the method 600 may also compare the difference between the $(n-1)^{th}$ accumulated compressed data size $C_{n-1}$ and the $(n-1)^{th}$ accumulated target data size $T_{n-1}$ with other predetermined thresholds, and accordingly determine the number of LSB to be removed, so that the method 600 can more accurately control the compression rate and image quality.

In some embodiments, step S660 to S672 of the method 600 may be omitted. In step S640, when the difference between the $(n-1)^{th}$ accumulated compressed data size $C_{n-1}$ and the $(n-1)^{th}$ accumulated target data size $T_{n-1}$ is greater than the first predetermined threshold TH1, step S680 is directly performed instead of comparing the difference between the $(n-1)^{th}$ accumulated compressed data size $C_{n-1}$ and the $(n-1)^{th}$ accumulated target data size $T_{n-1}$ with the second predetermined threshold TH2, thus simplifying the process of the method 600.

The method 600 is capable of adaptively determining whether to remove the LSB of each set of data in a block that needs to be compressed, and the number of LSB to be removed if so, and is therefore capable of accurately controlling the compression rate and image quality.

In conclusion, the method for compressing image data and the image data compressing system of the present invention are capable of dynamically determining whether to remove the LSB of each set of data in a block that needs to be compressed, and the number of LSB to be removed if so, and are therefore capable of more accurately controlling the compression rate compared to the prior art while also maintaining image quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for compressing image data, comprising:
    setting a target data increment of each of N blocks that need to be compressed of an image to be compressed according to a $0^{th}$ accumulated target data size and an $N^{th}$ accumulated target data size;
    before compressing an $n^{th}$ block among the N blocks, calculating an $(n-1)^{th}$ accumulated compressed data size of an $(n-1)^{th}$ block among the N blocks;

calculating an $(n-1)^{th}$ accumulated target data size of the $(n-1)^{th}$ block according to the 0th accumulated target data size and the target data increment;

removing X least significant bit(s) of a plurality of sets of data in the $n^{th}$ block when a difference between the $(n-1)^{th}$ accumulated compressed data size and the $(n-1)^{th}$ accumulated target data size is smaller than a first predetermined threshold to generate an updated $n^{th}$ block; and compressing the updated $n^{th}$ block to generate a compressed $n^{th}$ block;

wherein, N and X are finite positive integers, and n is a finite positive integer not greater than N.

2. The method according to claim 1, further comprising:

before an $m^{th}$ block among the N blocks is compressed, calculating an $(m-1)^{th}$ accumulated compressed data size of an $(m-1)^{th}$ block among the N blocks;

calculating an $(m-1)^{th}$ accumulated target data size of the $(m-1)^{th}$ block according to the $0^{th}$ accumulated target data size and the target data increment;

removing Y least significant bit(s) of a plurality of sets of data in the $m^{th}$ block when a difference between the $(m-1)^{th}$ accumulated compressed data size and the $(m-1)^{th}$ accumulated target data size is greater than the first threshold but smaller than a second threshold to generate an updated $m^{th}$ block; and compressing the updated $m^{th}$ block to generate a compressed $m^{th}$ block;

wherein, the second predetermined threshold is greater than the first predetermined threshold, Y is a finite positive integer smaller than X, and m is a finite positive integer not greater than N and different from n.

3. The method according to claim 2, wherein X is 2 and Y is 1.

4. The method according to claim 1, wherein $0^{th}$ accumulated target data size is greater than the first predetermined threshold.

5. The method according to claim 1, further comprising updating the $0^{th}$ accumulated target data size according to compression archives of each of the blocks that needs to be compressed.

6. The method according to claim 1, wherein the $N^{th}$ accumulated target data size is a total data size divided by a target compression rate.

7. An image data compressing system, comprising:

a compressor, compressing an image to be compressed according to a predetermined compression algorithm, wherein data of the image comprises N blocks that need to be compressed; and a compression rate control circuit, coupled to the compressing module, comprising:

a compressed data accumulator, calculating an $(n-1)^{th}$ accumulated compressed data size of an $(n-1)^{th}$ block among the N blocks before an $n^{th}$ block among the N blocks is compressed according to a block compressed data size that the compressing module generates after compressing the $(n-1)^{th}$ block;

a target data accumulator, calculating an $(n-1)^{th}$ accumulated target data size of the $(n-1)^{th}$ block according to a $0^{th}$ accumulated target data size and a target data increment of each of the blocks; and a comparator, outputting a first compression control signal to the compressing module when a difference between the $(n-1)^{th}$ accumulated compressed data size and the $(n-1)^{th}$ accumulated target data size is smaller than a first predetermined threshold;

wherein, the compressing module further removes X least significant bit(s) of a plurality of sets of data in the $n^{th}$ block to generate an updated $n^{th}$ block when receiving the first compression control signal, and compresses the updated $n^{th}$ block to generate a compressed $n^{th}$ block; and N and X are finite positive integers, and n is a finite positive integer not greater than N.

8. The image data compressing system according to claim 7, wherein:

the compressed data accumulator further calculates an $(m-1)^{th}$ accumulated compressed data size of an $(m-1)^{th}$ block among the N blocks before an $m^{th}$ block among the N blocks is compressed;

the target data accumulator further calculates an $(m-1)^{th}$ accumulated target data size of the $(m-1)^{th}$ block according to the $0^{th}$ accumulated target data size and the target data increment;

the comparator further outputs a second compression control signal to the compressing module when a difference between the $(m-1)^{th}$ accumulated compressed data size and the $(m-1)^{th}$ accumulated target data size is greater than the first threshold but smaller than a second threshold;

the compressor further removes Y least significant bit(s) of a plurality of sets of data in the $m^{th}$ block when the second compression control signal is received to generate an updated $m^{th}$ block, and compresses the updated $m^{th}$ block to generate an compressed $m^{th}$ block; and the second predetermined threshold is greater than the first predetermined threshold, m is a finite positive integer not greater than N and different from n, and Y is a finite positive integer smaller than X.

9. The image data compressing system according to claim 8, wherein X is 2 and Y is 1.

10. The image data compressing system according to claim 7, wherein $0^{th}$ accumulated target data size is greater than the first predetermined threshold.

11. The image data compressing system according to claim 7, wherein the compression rate control circuit further updates the $0^{th}$ accumulated target data size according to compression archives of each of the blocks that needs to be compressed.

12. The image data compressing system according to claim 7, wherein the $N^{th}$ accumulated target data size is a total data size divided by a target compression rate.

* * * * *